United States Patent [19]
Denherder

[11] 3,749,227
[45] July 31, 1973

[54] AUTOMATIC EGG RECEIVING AND POSITIONING MACHINE TO ORIENTATE EGGS FOR VACUUM LIFT PLACEMENT IN CONTAINERS

[75] Inventor: Gerald Denherder, Tacoma, Wash.
[73] Assignee: National Poultry Equipment Co., division of Dawson & Co., Inc., Renton, Wash.
[22] Filed: Sept. 10, 1971
[21] Appl. No.: 179,503

[52] U.S. Cl. .............................. 198/33 AA, 198/30
[51] Int. Cl. ............................................. B65g 47/24
[58] Field of Search ......................... 198/33 AA, 30

[56] References Cited
UNITED STATES PATENTS

| | | | |
|---|---|---|---|
| 3,478,862 | 11/1969 | Niederer | 198/33 AA |
| 2,186,652 | 1/1940 | Orth et al. | 198/33 AA |
| 3,463,292 | 8/1969 | Boon et al. | 198/33 AA |

FOREIGN PATENTS OR APPLICATIONS

| | | | |
|---|---|---|---|
| 6,506,394 | 11/1966 | Netherlands | 198/30 |

Primary Examiner—Harvey C. Hornsby
Assistant Examiner—James W. Miller
Attorney—Roy E. Mattern, Jr.

[57] ABSTRACT

The receiving, arranging, and placement of individual eggs into containers for subsequent handling and/or shipment using vacuum egg lifting devices is accomplished more effeciently with greater speed and little or no breakage of eggs through operation of this automatic egg receiving and positioning machine. Each egg generally coming on a conveyor, either from conveyors located throughout a chicken farm or from conveyors receiving cleaned and graded eggs, is gently aligned in a row. Thereafter, it is moved, with its heavier pointed end below and its lighter air cell rounded end above, to join a preselected group of eggs matching the capacity of a container to be filed. Then an air vacuum lifting unit is operated to gently secure each egg, as the group of eggs is quickly transferred to the container. All the eggs, during the transfer, remain positioned with their heavy pointed ends below, as required for their subsequent handling and shipment while so packaged.

This egg receiving, arrangement, and placement machine utilizes the operational advantages gained when high frequency oscillatory motions are created. A chevron arrangement of an egg separator having multiple guides is oscillated back and forth, while slidably supported on a moving wire mesh conveyor, to meet and align the eggs into horizontal rows with their major axes parallel to the directions of both the oscillatory separater movement and the oncoming wire mesh conveyor movement. The chevron egg separator is pivotally secured to the follow on grid having tapered egg support bars adjustably spaced to hold an average size egg, then being processed, near its maximum transverse diameter. The grid is adjustably and flexibly supported on leaf return springs secured in turn to the machine framing. A driven shaft with its motor, both also secured to the machine framing, turns cams, mounted on the driven shaft, to contact cam followers which are replaceably and adjustably mounted on the grid. When the grid is moved, upon each rotation of the cams against the force of its supporting leaf return springs, the grid, in sequence, quickly drops away from a group of eggs, then quickly advances below eggs, abruptly slows down while raising up to meet a different group of eggs, and thereafter returns the new group of eggs at a slower but accelerating pace bringing them automatically into a group configuration, with their heavier pointed ends below, ready for immediate vacuum lifting and placement in containers.

Side by side units are arranged of combined egg separators and grids, often powered by the same motor and its driven shaft with multiple cams, to increase the overall egg orientation capacity. All embodiments have adjustable components easily manipulated to meet the changing operational demands originating when different sized eggs often with different surface conditions are to be received and positioned. Also automatic conveyor shut off control subassemblies are used to avoid any excessive egg quantity build up that might otherwise occur, if conveyor speeds become out of adjustment or any machine or component thereof might fail, and/or an operator might be temporarily absent or otherwise inattentive to the potential or actual excessive build up conditions, which often cause egg shell damage. In each embodiment and in each installation environment each machine is equipped to always carefully and automatically handle each egg, as groups of eggs are arranged for vacuum lifting and packaging with their heavy pointed ends orientated below as required for subsequent handling and shipment.

7 Claims, 9 Drawing Figures

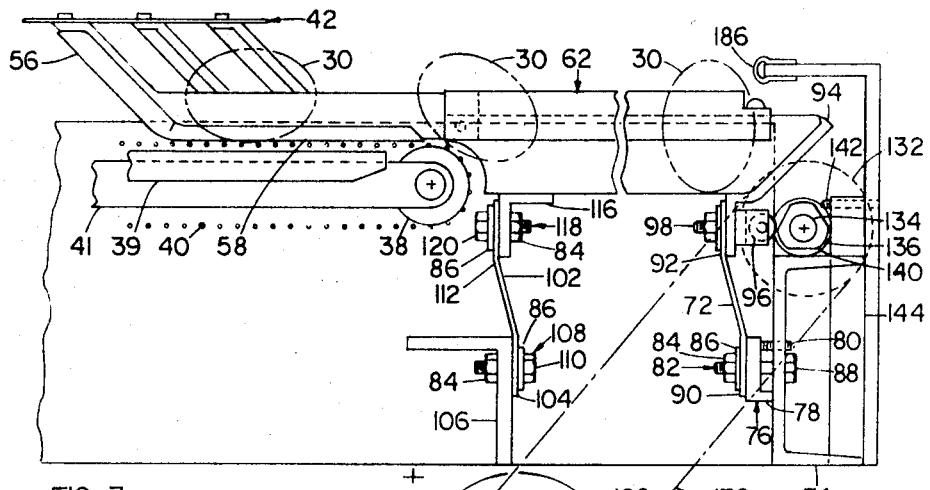

AUTOMATIC EGG RECEIVING AND POSITIONING MACHINE TO ORIENTATE EGGS FOR VACUUM LIFT PLACEMENT IN CONTAINERS

BACKGROUND OF INVENTION

Eggs being collected throughout chicken farms and also being gathered following cleaning and grading have been generally massed together in random positions. Some orientation resulted, but generally individual eggs had to be repositioned by persons packaging them for subsequent handling and/or shipment. The orientation generally undertaken by finger manipulation was time consuming and quite often resulted in some eggs being broken. As a consequence the full potential of vacuum lifting units designed to gently and securely lift a group of eggs for placement in a carton or flat was never realized. Either they were not used al all and hand manipulations were fully utilized, or they were only used after selected hand manipulations were relied upon to position some eggs to match those eggs, which by happenstance, had correctly positioned themselves with their heavier pointed ends down and their lighter rounded air cell ends up. Such position corresponds to the preferred orientation of each egg during its subsequent handling and shipment in various sized containers.

There remained therefore, a requirement for automatically receiving and positioning eggs arriving at a packaging location to orientate them uniformly with their pointed heavier ends below and their rounded air cells ends above while also arranging them into preselected groups corresponding to container sizes. When so automatically, quickly, and gently arranged, then the full effectiveness of a person using an egg vacuum lifting unit would be realized and the overall packaging operations could be more efficiently accomplished. This is now done by operating the automatic egg receiving and positioning machine which properly orientates the eggs.

SUMMARY OF THE INVENTION

Automatic egg receiving and positioning machines orientate eggs for placement into containers as eggs arrive on respective conveyors either bringing cleaned and graded eggs from a grading machine, or in a different location bringing eggs from a collector conveyor system of a chicken farm. In reference to a receiving and positioning machine operated to arrange cleaned and graded eggs for packaging, after their grading by weight, eggs are ejected onto an operating wire mesh conveyor moving between adjustable guides utilized to keep like graded eggs together. They are then carried into an oscillating egg separator for guided alignment into a selected number of rows of eggs with their longitudinal axes arranged in line with the direction of conveyor motion. Upon reaching the end of the wire mesh conveyor, the eggs are moved on ahead by the motion of the following eggs onto an oscillating egg receiving and positioning grid, where vertically tapered support bars of this oscillating grid receive the eggs. Soon the eggs are supported near their major transverse diameter and they are uniformly arranged in rows with their pointed ends of greater mass pointing downwardly ready to be lifted by a vacuum egg holding device. It is used to contact the eggs about their air cell ends and then move them into a carton or flat for subsequent handling and shipment.

The egg separator is pivotally attached to the support bars of the egg receiving and positioning grid and slidably rested on the wire mesh conveyor. The egg receiving and positioning grid with its vertical tapered parallel support bars continues on the spacing set by the egg separator. This grid is mounted with leaf return springs which in turn are adjustably secured to framing of the overall machine. An electric motor powering a driven shaft moves cams secured to the shaft which contact cam followers secured to the egg receiving and positioning grid. The cam surfaces are formed to cause the grid with its vertically tapered egg support bars to quickly drop away from the eggs, to quickly advance forward clear of eggs, then to move up more slowly to contact eggs, and then to return with eggs at a slower but accelerating pace. Such cam controlled high frequency oscillatory motion constantly monitored by the return force of the leaf support springs causes the grid to receive and position the eggs, as they appear to be moving up an incline until they are neatly arranged in rows awaiting liftout by a vacuum lifting unit. Several side by side subassemblies of these high frequency oscillatory separators and grids may be used to receive and position eggs coming from side by side grading conveyor channels. All such subassemblies preferably receive operating power from the same electric motor and its driven shaft with multiple cams.

In reference to a receiving and positioning machine operated to arrange eggs coming on conveyors from different locations throughout a chicken farm, the arrangement of various components is substantially similar to the machine receiving eggs following their cleaning and grading. Generally, however, a conveyor approach area has drop through spaces to allow broken egg portions and other debris to fall below into a collector container while keeping unbroken eggs on their way. Thereafter, a like wire mesh conveyor is used and preferably it is readily adjustable in height to be raised or lowered with respect to receiving and positioning grid depending on the more general or average egg sizes being orientated during a particular operating period. Also automatic switch off controls and their respective sensors, monitored by time delay relays, are used to shut down the immediate conveyor of the egg receiving and positioning machine and/or the central egg collection conveyor system, in whole or in part throughout a chicken farm to avoid egg pile ups that otherwise would cause egg shell damage.

Wherever used, the automatic egg receiving and positioning machines delicately, quickly and accurately orientate eggs with their pointed ends down in multiple rows of a selected overall pattern such as 12, 30, 36, etc., with respect to various embodiments of the machines. Thereafter, a designated group of eggs is contacted gently and securely and then moved to a container by operation of a vacuum lifting unit, where the group is released directly into their packaged positions for subsequent container handling and shipment.

DRAWINGS OF THE PREFERRED EMBODIMENTS

FIG. 3 is a partial sectional view of the automatic egg receiving and positioning machine in the vicinity of both the egg separator and egg grid;

FIG. 4 is a schematic side view indicating the oscillating motion of components of the automatic egg receiving and positioning machine with particular reference to cam directed movements of the leaf return spring supported egg grid;

FIG. 5 is a partial transverse sectional view showing the egg grid supporting an egg near the eggs maximum transverse diameter and with its heavier pointed end below;

FIG. 6 is a partial perspective view looking down at the egg grid, its cam follower, a cam, a driven cam shaft, a shaft bearing, and a bearing retainer;

FIG. 7 is a perspective view of the egg separator and its attachment to the egg grid, shown partially, indicating by removal of a portion of one of the tapered covers from a spacer, how the pivotal attachment is made of an egg separator to an egg grid, and also indicating how the side by side distance between spacers or guides may be adjusted;

Figure 8:
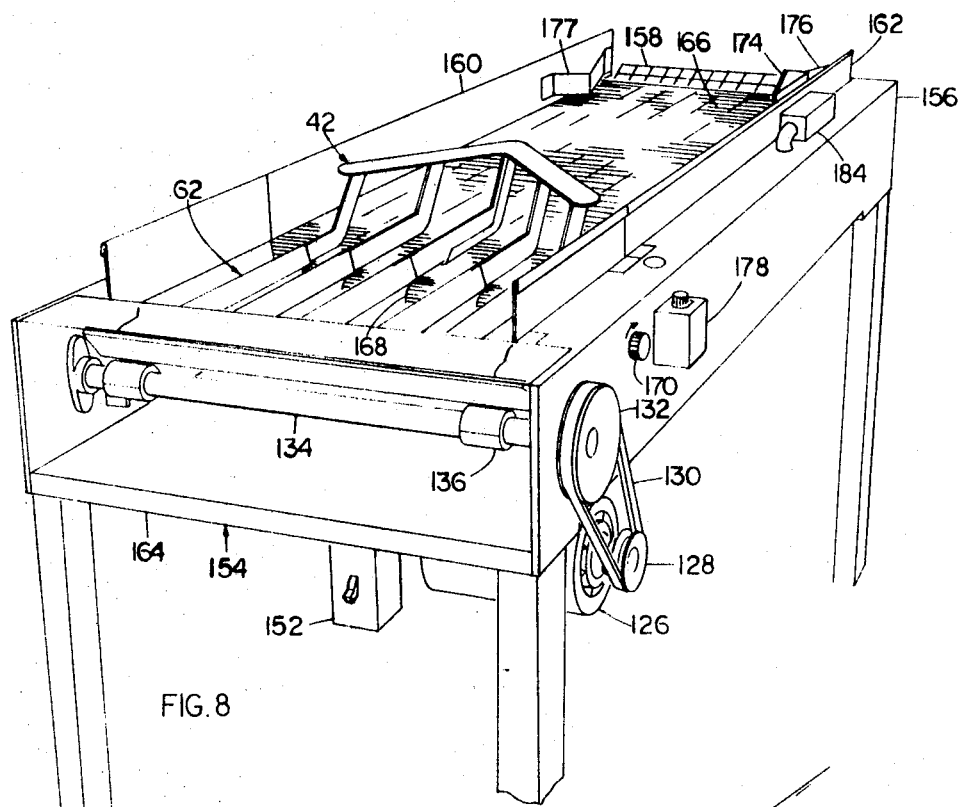
Figure 9:
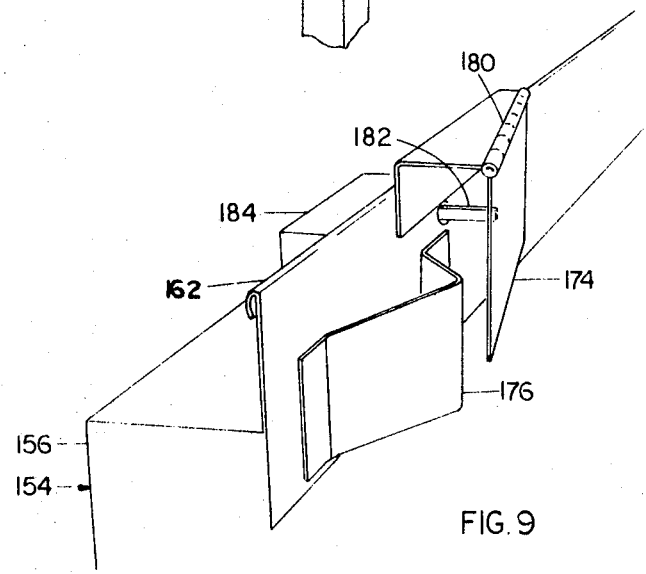

FIG. 8 is a partial perspective view of an automatic egg receiving and positioning machine arranged to receive eggs, arriving from central egg collection conveyors, not shown, of a chicken farm; and FIG. 9 is an enlarged view of portions of a pressure or deflection sensor subassembly utilized to automatically detect a potential serious build up of a supply of eggs being handled by the egg receiving and positioning machine, and then to automatically shut down egg conveyors stopping the egg build up and thereby avoiding damage to any egg shells.

DESCRIPTIONS OF PREFERRED EMBODIMENTS

Automatic Egg Receiving and Positioning Machine Arranged in Conjunction With an Egg Cleaning and Grading Machine

General Arrangement

Figure 1:
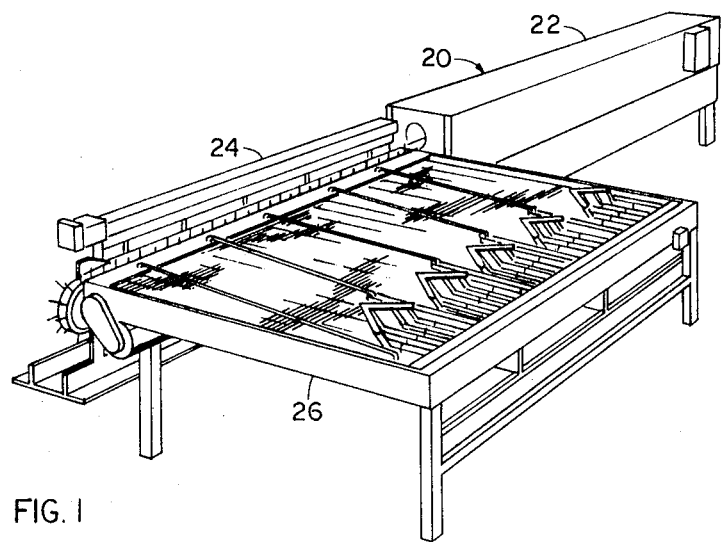
FIG. 1 is a perspective view of an automatic egg receiving and positioning machine arranged in conjunction with an egg cleaning and grading machine.

As indicated in FIG. 1, a combined machine 20 having egg cleaning unit 22 and a grading by weight unit 24 is arranged in conjunction with an automatic egg receiving and positioning machine 26. A cleaned egg 30, leaving cleaning unit 22, proceeds along on a grading conveyor 32 in grading unit 24, until its weight actuates a pre set ejector assembly 34 which moves the egg to the automatic egg receiving and positioning machine 26. There it is kept with others of like grade, as determined by their weight, by confinement between adjustably spaced egg grade divider bars 36 while being moved forward on a wire mesh conveyor 40 in random positions. This conveyor 40 has sprockets 38 and graphite embedded nylon capped 39 support and spacing bars 41. The conveyor 40 is driven by motor 43.

OSCILLATING EGG SEPARATOR

Figure 2:
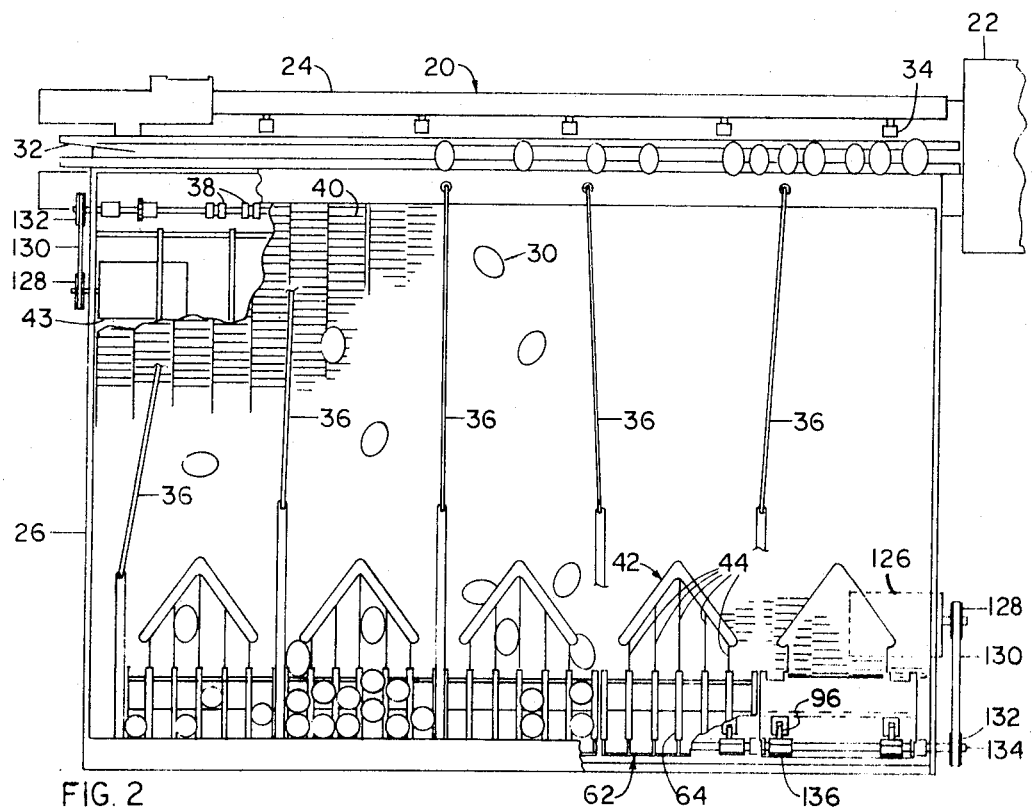
FIG. 2 is a top view of part of the egg cleaning and grading machine and all of the automatic egg receiving and positioning machine.

As indicated in FIGS. 1, 2 and 3, as the end of the run of wire mesh conveyor 40 is approached, the eggs are confronted with an oscillating egg separator 42; as shown in FIG. 7 it has five spaced guides 44 with up turned forwardly inclined, diagonal or rake ends 46, adjustably secured above to one another by a chevron or Vee shaped connector 48, utilizing multiple slots 50 in connector 48 and bendable tabs 52 on turned up ends 46. Each diagonal up turned end 46 has its leading edge covered with a graphite impregnated nylon strip 56 to improve the egg passage frictional characteristics and to reduce the wear on each guide 44. The center guide also has a graphite impregnated nylon strip 58, often an integral part of its strip 56, serving as the friction reducing surface and wear surface that makes oscillating and sliding contact with wire mesh conveyor 40 while it supports the egg separator 42 where it extends over conveyor 40.

The oscillating motion of egg separator 42, working within the area defined by respective spaced egg grade divider bars 36 and utilizing them and its own five spaced guides 44, aligns on coming like graded eggs 30 into six rows with their respective longitudinal egg axes aligned in the direction of both the motion of wire mesh conveyor 40 and the oscillating motion of egg separator 42. The eggs 30 still must be orientated so their heavier pointed ends will be pointing downwardly to properly prepare them for subsequent vacuum lifting and placement in a container in this required air cell up position.

OSCILLATING EGG GRID

As illustrated in FIGS. 1, 2, and 3, after eggs 30 are aligned in rows by oscillating egg separators 42, they reach the end of the run of wire mesh conveyor 40. Subsequently, eggs 30, moved on ahead by oncoming aligned eggs 30, are gently contacted from below by an oscillating egg grid 62 having vertically tapered egg support bars 64 each aligned with a guide 44 of egg separator 42 and pivotally connected to its respective guide 44. The tapered portions of each support bar 64 are provided by installing nylon covers 66 having an included apex angle of 30°, or some angle between 10° to 45°.

As illustrated in FIG. 5, pairs of support bars 64 with tapered covers 66, ultimately as oscillations continue, hold each egg 30 near its major transverse diameter with its heavier pointed end below and its air cell rounded end above. The nylon tapered covers 66 increase the effectiveness of such orientation movement, reduce wear, and allow for some variations in the diameters of eggs. Even though at this time they have been graded by weight their outer sizes are variable.

As indicated in the schematic drawing of FIG. 4, after gently contacting a group of eggs 30, the oscillating egg grid 62 accelerates in the direction of the wire mesh conveyor 40 and the on coming eggs 30. Then upon reaching an egg grouping termination position located at the edge of this machine 26, oscillating egg grid 62 drops quickly away clearing all of its tapered egg support bars 64 from eggs 30. Following such clearance, it advances quickly below eggs 30 and then as it slows down it rises upwardly to recontact eggs carrying them briefly toward the egg grouping termination position as the oscillations continue.

In one machine oscillations occur at the rate of 1,600 strokes per minute with each stroke having a translating movement of 35 thousandths of an inch. During observations of such high frequency oscillating movements, the eggs appear to be carried up a slight grade into their ultimate grouping positions as they change their orientation from horizontal alignment in the oscillating egg separator to vertical positions with their pointed ends downward, while being supported on oscillating egg grid 62.

SUPPORTS AND OPERATING MECHANISMS FOR THE OSCILLATING EGG GRID

As shown in FIG. 3, oscillating egg grid 62 is mounted on leaf springs. Generally, two slightly heavier leaf springs 72 are spaced apart and secured below to machine framing 74 by using angular adjustable subassemblies of fasteners 76. Each subassembly 76 has an inclinable spacing angle 78 used to change the effective spring tension, an adjustable set screw 80 to change the incline of spacer 78, and a fastener combination 82, having a nut 84, a washer 86, and a bolt 88 to secure the leaf spring bottom end 90 and spacing angle 78 to frame 74. Above, leaf springs 72, have their top ends 92 bolted to a cross member 94 which in turn is integrally formed with egg support bars 64 of oscillating egg grid 62. At or near this top bolting place, a replaceable cam follower 96 is installed, as bolt 98, nut 84 and washer 86 are used. Each leaf spring 72 has fifteen degree offset bends adjacent to its connected ends 90, and 92, which position the top spring ends 92 nearer the oncoming eggs 30, while positioning the springs 72 to make their returning force more effective.

Two slightly lighter leaf springs 102 are spaced apart and secured below at their bottom ends 104 to another portion 106 of machine framing 74 using a fastener combination 108 having bolts 110, nuts 84, and washers 86. Above at their top ends 112, leaf springs 102 are removably secured to a cross member 116, permanently attached, in turn, to the egg support bars 64 of the oscillating egg grid 62. Fastener combinations 118, having bolts 120, nuts 84 and washers 86 are tightened to secure top ends 112 of leaf springs 102 to cross member 116. Each leaf spring 102 also has 15 degree offset bends adjacent to its connected ends 104 and 112, which position the top spring ends 112 nearer the oncoming eggs 30, while positioning the springs 102 to make their returning force more effective.

Preferably a high speed electric motor 126 is secured to machine framing 74 to power its output pulley or sprocket 128 to move drive belt or chain 130 carrying its power above to a pulley or sprocket 132 secured in turn to the driven cam shaft 134, as shown in FIG. 3. The driven cam shaft 134 throughout its length has cams 136 secured to it, each being located opposite each cam follower 96. As illustrated in FIG. 6, nearby each cam 136 and elsewhere shaft bearings 140 are installed and removably restrained vertically in place, as is the shaft 134, by adjustment of above center positioned set screws 142 threaded through portions 144 of machine framing 74.

Upon operation of high speed motor 126 its power is transferred to driven cam shaft 134. Then each cam 136 on rotating shaft 134, shaped as illustrated in FIG. 3, helps create with the other cams 134, and the forces of the leaf springs 72 and 102 the non uniform velocity oscillation movement of oscillating egg grid 62. It drops away from eggs 30, moves quickly forward below them, raises and slows to contact other eggs 30, commences an accelerated return with eggs 30, and then oscillates again in a repeating like motion path. These repeated motive forces orientate the previously aligned eggs coming from the egg separator 42, into vertical positions with their heavy pointed ends down, and also continues to arrange the eggs 30 in groups for vacuum lifting and placement in containers.

As illustrated in FIGS. 2, 3, and 7, the same oscillating power applied to the oscillating egg grid 62 is transferred to the oscillating egg separator 42 through pivot pin 146 and slot 148 connections 150. However, oscillating egg separator follows only a one level oscillation path being pivotally secured by pins 146 and guided below by its sliding contact with wire mesh conveyor 40, in contrast to the multiple level oscillation path of oscillating egg grid 62 supported by its leaf return springs 72, 102 during its cam actuated movements.

Automatic Egg Receiving and Positioning Machine Arranged in Conjunction with a Central Egg Collection Conveyor System of a Chicken Farm As illustrated in FIG. 8, another embodiment of an automatic egg receiving and positioning machine 154 is arranged to receive eggs arriving on an egg collection conveyor, not shown. At its entry end 156, a spaced open grid 158 is located between guiding plates 160 and 162 secured to the framing 164 of machine 154. As the eggs 30, debris, and parts of eggs, are pushed forward by oncoming eggs, the debris, and parts of eggs drop through into removable receiving containers, not shown. Undamaged eggs 30 are moved forward by oncoming eggs to contact and be moved ahead by wire mesh conveyor 166 which is adjustable in elevation at its terminal end 168.

Such adjustment, up and down of conveyor 166, by control 170, is made to accommodate changes in the average sizes of eggs being processed to correctly position them after alignment by the oscillating edge separator 42, at the proper elevation for an excellent pick up by the oscillating egg grid 62. Both the oscillating egg separator 42 and egg grid 62, are secured together, supported, and operated as indicated previously in describing machine 26. Similar numerals are used to indicate like parts shown throughout the figures as indicated in FIG. 8.

SENSING AND SWITCHING SUBASSEMBLIES TO STOP CONVEYORS

In both machines 26 and 154, and especially in reference to this egg receiving and positioning machine 154, there is often a need for a sensing and switching subassembly to stop the conveyors bringing eggs 30 to these machines, if the continued arrivals of eggs might or would lead to an egg pile up, egg shell cracking, and consequent losses. Therefore, as illustrated in FIGS. 8 and 9, eggs 20 are guided around an angled pressure contact plate or sensor 174 located at one side, by an angled redirection guide plate 176 avoiding contact with sensor 174. A similarly shaped guiding structure 177, restricting the entering distance is located on the opposite side. However it is a solid member without a movable pressure contact plate or sensor 174. However, if eggs 30 are jamming up ahead, some eggs 30 already cleared around guide plate 176 will be moved about often transversely coming into contact with the sensor 174. After a passage of a reasonable delay time period adjustably set with automatic controls 178, the deflecting movement of sensor 174 about its hinge 180 will cause its actuating arm 182 to open a switch unit 184, cutting the flow of electrical energy to a conveyor, not shown, and thereby stopping it and consequently stopping the supply of eggs 30 to the jamming area of egg receiving and positioning machine 154. The switch unit 184 will override the main on and off switch 152.

EMBODIMENT MODIFICATIONS

Oscillatory motion of the egg grid and egg separator is preferred and considered the most effective. However somewhat random high frequency vibrations will cause orientation movement of the eggs. Preferably the moving forces applied to the egg grid are also applied to the egg separator. However, separate moving forces might be relied upon probably in a less effective way.

Although both illustrated embodiments, include a wire mesh conveyor, other types of conveyors or translating machines might be used. Moreover, each embodiment might be reduced in size by not including a conveyor if one were to be already available in an established machine environment. Then only the egg separator and egg grid operating areas or portions of the machine would be furnished for installation. However, because of the need for adjusting the elevation of the conveyor or its equivalent, in reference to various sizes of eggs approaching the egg separator and ultimately to be supported on the egg grid, these automatic egg receiving and positioning machines preferably will include conveyors. This is especially true where sensing equipment is to be furnished to avoid serious jams of eggs potentially leading to egg breakage losses.

In respect to power sources, the reliance on two electric motors is preferred. One high speed motor will drive the orientation components and one low speed motor will drive the conveyor. Other energy sources and their utilization might be used but probably less effectively.

ADVANTAGES GAINED BY OPERATING EGG RECEIVING AND POSITIONING MACHINES

The principal advantage is the saving of time. Or stated in another way, by increasing the egg packaging rate more eggs are packaged by using fewer machines.

Moreover, operating personnel are more effective as they work under less frustrating circumstances than previously when many eggs had to be individually orientated to meet the packaging objective of eggs positioned with their heavy pointed ends directed downwardly in the carton or flat spaces. Now the full potential of using the time saving vacuum egg lifting units is recognized. The lifting movements are sequenced more often because there is little or no need for an operator to manipulate any egg into position for vacuum lifting. One operator using one embodiment of the egg receiving and positioning machine 154 and handling a vacuum lift unit may fill up to 40 cases of eggs per hour. Also because less finger manipulation is involved and jamming sensors are relied upon, and cushions 186 are used, eggs are seldom broken.

I claim:
1. An automatic egg receiving and positioning machine to orientate eggs with their pointed end down and their round air cell end up for vacuum lift placement into containers, comprising:
   a. a machine frame;
   b. a powered conveyor positioned with respect to the machine frame and when operated to deliver eggs in random directional positions and in various quantities with the principal axes of the eggs being essentially horizontal;
   c. an oscillatable egg mover to slidably advance over the powered conveyor during its operation to direct the eggs into parallel rows with their principal axis remaining essentially horizontal and then aligned with the direction of motion of the conveyor, comprising, in turn, spaced parallel guides having their entry ends raised upwardly at an angle and then as a group these guides are arranged in different lengths to be joined at their raised ends by a horizontal chevron shaped interconnector, and the other ends of the spaced parallel guides are arranged opposite one another and formed with connecting pin receiving structure;
   d. an oscillatable egg orientating and moving grid to receive eggs leaving the oscillatable egg mover in multiple rows and also at the same time leaving the powered conveyor, and then orientate the eggs during its high frequency two level oscillatory motion to position the eggs with their pointed ends down and also to move them along in such position into a packaging group, awaiting removal with a vacuum lifter, comprising, in turn, spaced parallel egg support bars mounted on a sub frame and having triangular cross section top portions presenting between these side by side egg support bars an effective egg receiving width greater at their top and gradually becoming narrower down to the base of their triangular cross section top portions, these spaced parallel egg support bars having leading ends centrally and vertically slotted and formed with connecting pin receiving structure and a connecting pin, whereby this oscillatable egg orientating and moving grid is pivotally connected to the oscillatable egg mover which directs the eggs into the parallel rows; and
   e. a subassembly of a power unit and actuating and supporting mechanisms to move the oscillatable egg orientating and moving grid in a high frequency two level oscillatory motion to position the eggs with their pointed ends down and also to move them along in such position into a packaging group for removal with a vacuum lifter, and to also slidably move the oscillatable egg mover which is pivotally attached to the oscillatable egg orientating and moving grid, thereby slidably oscillating the egg mover with its leading chevron orientated space parallel guides into oncoming bunches of eggs to divide these bunches of eggs progressively into multiple side by side parallel rows, comprising, in turn, leaf springs arranged in a group preferably of four springs with respect to the oscillatable egg orientating and moving grid, being removably secured at their top portions on the sub frame which holds the spaced parallel egg support bars and being removably secured at their bottom portions to the machine frame, a cam follower secured to the resulting subassembly of both the leaf springs and the mounted spaced parallel egg support bars, a cam positioned with the cam follower, a shaft rotatably supported on bearings, and the bearings removably secured to the machine frame, so the shaft thereby is positioned to firmly support and to rotate the cam, and a power unit supported on the machine frame to drive the shaft, so upon operation of the power unit, preferably a high speed electric motor, the shaft is rotated at high speeds causing the cam with its irregular shaped cam surface to effectively move the cam follower and consequently the subassembly of both the leaf springs and the mounted spaced parallel egg support bars whereby both the oscillatable egg orientating and moving grid and the oscillible egg mover are moved against the return forces of the leaf springs, and to obtain the effective overall motion, the cam and cam follower and the leaf springs are further arranged and adjusted to move the oscillatable egg orientating and moving grid in a cycle of a two level oscillatory motion in a sequence as follows: quickly downwardly from the grouping of eggs, then quickly forwardly below the grouping of eggs, then slowly upwardly to recontact the grouping of eggs, then accelerating very quickly on a returning motion, and then thereafter commencing another like cycle followed by succeeding cycles as the power unit continues to operate and eggs are aligned in rows, orientated, and positioned for packaging.

2. An automatic egg receiving and positioning machine to orientate eggs with their pointed end down and their round air cell end up for vacuum lift placement into containers, as claimed in claim 1, wherein the machine frame and the subassembly of a power unit and actuating and supporting mechanisms are made sufficiently large enough to accommodate several side by side subassemblies of oscillatable egg movers and oscillatable egg orientating and moving grids which then receive eggs from the distribution conveyor of an egg grading machine.

3. An automatic egg receiving and positioning machine to orientate eggs with their pointed end down and their round air cell end up for vacuum lift placement into containers, as claimed in claim 1, wherein a pressure switch subassembly is positioned just ahead of the oscillatable egg mover and electrically connected to a power unit of a supply conveyor bringing eggs in random positions and quantities to the oscillatable egg mover, and the pressure switch subassembly senses the excessive crowding of oncoming eggs and shuts down the power unit of the supply conveyor until the pressure is reduced.

4. An automatic egg receiving and positioning machine to orientate eggs with their pointed end down and their round air cell end up for vacuum lift placement into containers, as claimed in claim 1, wherein in the subassembly of a power unit and actuating and supporting mechanisms, above center overlapping threaded retainers are used to keep the shaft bearings in place on the machine frame and yet these threaded retainers are quickly removed so the entire subassembly of the bearings, shaft, and cams, may be quickly removed for inspection, cleaning, adjustments, and/or repairs.

5. An automatic egg receiving and positioning machine to orientate eggs with their pointed end down and their round air cell end up for vacuum lift placement into containers, as claimed in claim 1, wherein the powered conveyor is aligned with the collection conveyor of a hen house.

6. An automatic egg receiving and positioning machine to orientate eggs with their pointed end down and their round air cell end up for vacuum lift placement into containers, as claimed in claim 1, wherein the powered conveyor is aligned with the exit mechanisms of an egg grader.

7. An automatic egg receiving and positioning machine to orientate eggs with their pointed end down and their round air cell end up for vacuum lift placement into containers, as claimed in claim 1, wherein the powered conveyor may be the conveyor of another machine such as an egg grader.

* * * * *